Figure 1:
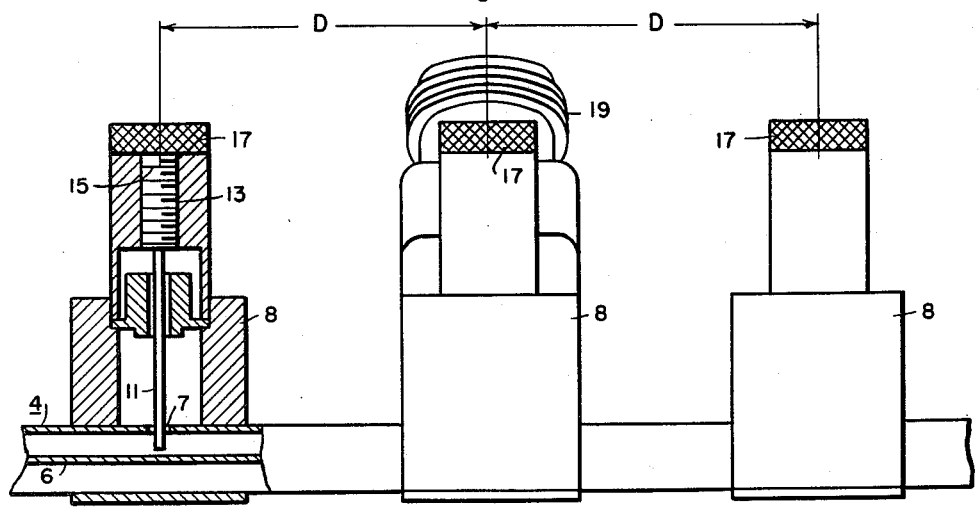

Feb. 16, 1954  C. E. VOGELEY, JR., ET AL  2,669,694
MODULATOR
Filed April 28, 1951

WITNESSES:
E. A. M^cCloskey
Marcus W. Dodd

INVENTORS
Clyde E. Vogeley, Jr.
and William L. Stahl.
BY
F. E. Browder
ATTORNEY

Patented Feb. 16, 1954

2,669,694

UNITED STATES PATENT OFFICE 2,669,694

MODULATOR

Clyde E. Vogeley, Jr., Pittsburgh, Pa., and William L. Stahl, Ypsilanti, Mich., assignors to Westinghouse Electric Corporation, East Pittsburgh, Pa., a corporation of Pennsylvania Application April 28, 1951, Serial No. 223,494

7 Claims. (Cl. 332—52)

Our invention relates to the modulation of electromagnetic oscillations and, more particularly, to a waveguide modulating section for modulating electromagnetic oscillations and controlling the phase of modulation.

By the term "waveguide," we mean a hollow conductor for electromagnetic oscillations.

It is known in the prior art that it is possible to modulate the energy passing down a waveguide by the introduction of a probe into the waveguide. In apparatus of this type the probe is loaded with a crystal, the impedance of which crystal is varied by a modulating signal impressed across it. However, it has been found that the introduction of the probe into the waveguide causes a discontinuity in the waveguide which under most circumstances is highly undesirable.

Prior art practices would suggest the insertion of an attenuator into the waveguide to absorb the reflections, matching diaphragms to match the discontinuity, or a multiple stub matching section inserted between the modulating probe and the source, preferably by the insertion of a three-stub matching section placed between the source and the discontinuity, to match the impedances at the discontinuity. All of these types of apparatus are complicated, cumbersome and comparatively expensive.

It is, accordingly, an object of our invention to provide apparatus for modulating electromagnetic oscillations passing down a waveguide whereby a minimum amount of apparatus is required.

An ancillary object of our invention is to provide a load matching section for waveguides which is capable of modulating the energy passing down a waveguide, of matching the discontinuities produced by the matching section so as to reduce reflections toward the source, and of varying the phase of modulation.

An ancillary object of our invention is to provide a three-stub matching section which also operates as a modulating section and as a phasing section for a waveguide assembly.

In accordance with our invention, we provide a section of waveguide having attached thereto three probes, which are so mounted that the distance which the probes extend into the waveguide may be varied. Connected capacitively to the center probe of the three probes employed in the section is a diode crystal across which is impressed a modulation potential. The three probes are mounted, in accordance with the preferred embodiment of our invention, in such a manner that the distances between centers of successive probes are equal to an odd number of quarter wave length of the oscillations to be employed in the waveguide as measured in the waveguide.

In adjusting this apparatus in accordance with the preferred embodiment of our invention, the modulating probe, which is preferably the center probe, is inserted into the waveguide until a desired percentage of modulation is obtained. When the desired percentage of modulation is obtained, the remaining two probes, one of which is between the center probe and the source of electromagnetic oscillations and the other of which is on the opposite side of the center probe from the electromagnetic oscillations, are adjusted for a minimum standing wave ratio attainable along with the desired phase. Generally speaking, this adjustment of the matching probes is accomplished by means of a trial-and-error operation.

Figure 2:
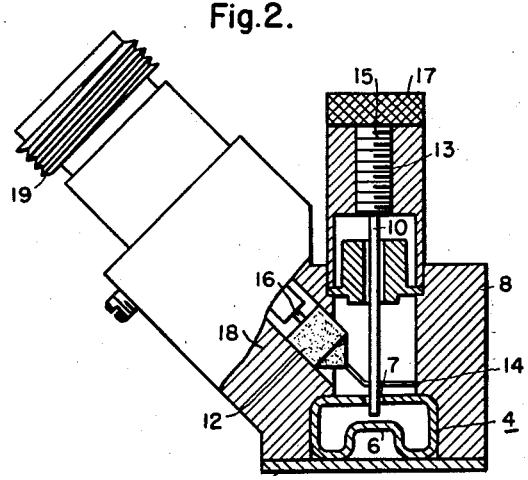

The novel features which we consider characteristic of our invention are set forth with more particularity in the appended claims. The invention, however, with respect to both the organization and the operation thereof, together with other objects and advantages, may be best understood from the following description of specific embodiments when read in connection with the accompanying drawing, in which:

Figure 1 is a showing partly in section and partly in elevation of apparatus embodying our invention, and Figure 2 is a showing partly in section and partly in elevation of the modulating probe and crystal and the mounting therefore as employed in the embodiment of our invention shown in Fig. 1.

In the preferred embodiment of our invention, a ridged waveguide 4 is provided which comprises substantially a hollow conductor of rectangular cross section having extending thereinto a re-entrant portion 6, the cross-sectional dimensions of which re-entrant portion are substantially constant throughout the length of the waveguide. In the opposite side of the waveguide 4 from the re-entrant portion 6 are provided three holes through the waveguide of sufficient diameter to allow the insertion of a probe through the holes. One of the holes is shown at the left side of Fig. 1 and indicated by the numeral 7. The three holes 7 are at different positions along the length of the waveguide 4, preferably in a straight line, extending along the waveguide 4 in the direction of propagation of energy in the waveguide 4. The three holes 7 for insertion of probes 10 into the waveguide 4 are preferably located so that the distance D between the centers of successive holes 7 is equal to an odd number of quarter wave lengths for the electromagnetic oscillations to be employed in the waveguide 4 as measured in the waveguide 4. Probes 10, 11 are provided for insertion in the holes 7, the probe 10 extending into the center hole 7 (shown in detail in Fig. 2) being a modulating probe and the other two probes 11 one of which is shown in Fig. 1 are matching and phasing probes.

Each of the three probes 10, 11 is provided with a mounting 8 which is fastened to the waveguide 4. The probes 10, 11 are inserted through a threaded hole 13 in the mountings 8 so that the threads 15 on the probes 10, 11 engage the threaded holes 13 of the mountings. The upper ends of the probes 10, 11 as shown in the drawing are provided with adjusting knobs 17. By turning the adjusting knobs 17 the distance which the probes 10, 11 extend into the waveguide 4 may be varied. These three probes 10, 11 preferably are so mounted as not to touch the waveguide 4 directly but rather to extend through the holes 7 into the waveguide 4 without touching the opposite side of the waveguide 4.

The center probe 10, shown in Fig. 2, which is the modulating probe, has a diode crystal 12 mounted nearby. The diode crystal 12 may be any of several crystals known in the art, the impedance of which is responsive to the potential applied thereto. In the preferred embodiment of my invention, a germanium crystal is employed. The diode crystal 12 is provided with a crystal probe 14, which is a small wire of conducting material attached to the crystal 12. The crystal probe 14 is coupled to the modulating probe 10. In the embodiment shown, the crystal 12 and crystal probe 14 are so mounted that the crystal probe 14 extends past the modulating probe 10 and is in close proximity to the modulating probe 10 at one point. By causing the crystal probe 14 to pass in close proximity to the modulating probe 10 a capacitive coupling between the modulating probe 10 and the crystal 12 is obtained. In a preferred embodiment of our invention the crystal probe 14 passes in close proximity to the waveguide 4 and then extends to touch the wall of the mounting 8 which is grounded to the waveguide 4. We are not aware of the reason why the contact between the crystal probe 14 and the probe mounting 8 is advantageous but we have found this to be true experimentally.

Connections are supplied for applying a modulating potential across the crystal. In the embodiment shown, the modulating signal is supplied through a coaxial cable having a center conductor 16 touching an end of the crystal 12 and an outer conductor 18 encircling the crystal. The outer conductor 18 also acts as the support for the modulating crystal 12. Connections 19 are supplied for connecting the coaxial cable to a source of modulation potential (not shown).

In the embodiment shown, modulation is effected by the use of a crystal 12. However, other means for modulating may be employed in accordance with the broader aspects of our invention such as by causing the modulating probe to vibrate or by causing a vane to vibrate while in close proximity to the probe, said vane being grounded, either directly or indirectly, to the waveguide.

In the operation of our apparatus in accordance with a preferred embodiment of our invention, the crystal 12 is adjusted so as to provide the proper capacitance between the crystal probe 14 and the modulating probe 10. The modulating probe 10 is then inserted into the waveguide 4 until the desired percentage of modulation is obtained. Next the two matching stubs 11 are adjusted so as to obtain a minimum standing wave ratio along with the desired phase modulation. Thus, when the apparatus is properly adjusted, we are able, with the use of only three probes extending into the waveguide 4, to produce a modulation of the energy passing down the waveguide 4, control the reflections toward the source of electromagnetic oscillations and control the phase of the modulation impressed on the electromagnetic oscillations. We are not sure exactly why this apparatus operates to control the phase in this manner. However, we have tested it repeatedly in the laboratory and have found this effect to be present.

Although we have shown and described specific embodiments of our invention, we are aware that other modifications thereof are possible. Our invention, therefore, is not to be restricted except insofar as is necessitated by the prior art and the spirit of the invention.

We claim as our invention:

1. In combination a waveguide, three probes attached to said waveguide in such a manner that they may be caused to extend into said waveguide a variable distance, said probes being located so as to interrupt different cross sectional areas along the length of said waveguide, and connections for effectively changing the impedance of that probe which is so located as to intercept a cross sectional area between the cross sectional areas intercepted by the other two probes.

2. A hollow conductor for electromagnetic oscillations having substantially a rectangular cross section with a re-entrant portion extending into said conductor and extending along said conductor parallel to the direction of propagation of energy in said conductor, three probes mounted on said conductor at different positions along the length of said conductor, said probes being mounted so that they may be caused to extend into said conductor a variable distance, said probes extending into said conductor through holes in the wall of said conductor opposite said re-entrant portion, and means for varying the impedance which one of the probes presents to the oscillations.

3. In combination, a segment of waveguide having a plurality of holes through one of its walls, said holes being located so as to intercept different cross sections along the length of said waveguide, said holes being so located that the distance between the centers of two successive holes is substantially equal to one quarter wave length of the oscillations to be employed in the waveguide as measured in the waveguide, a plurality of probes mounted on said waveguide so that they may be caused to extend through said holes into the interior of said waveguide a variable distance, and apparatus coupled to one of said probes for varying the impedance presented by that probe to oscillations in said waveguide.

4. In combination, a section of waveguide, a modulating probe and a plurality of matching probes extending into said waveguide, a diode crystal, connections for applying a modulating potential across said crystal, a probe connected to said crystal so that the current through said probe is responsive to the potential applied to said crystal, said probe being coupled to said modulating probe.

5. Apparatus substantially as described in claim 4 characterized in that said crystal coupling probe extends past said modulating probe and is grounded to said waveguide on the opposite side of said modulating probe from that on which said crystal is located.

6. A hollow conductor for electromagnetic oscillations having substantially a rectangular cross section, three probes mounted on said conductor at different positions along the length of said conductor, said probes being so mounted that they may be caused to extend into said conductor a variable distance, said probes being so located that successive probes are separated by a distance equal substantially to an odd number of quarter wave lengths of the oscillations to be employed in the conductor as measured in the conductor, a diode crystal capacitively coupled to one of the probes and circuit means connected to said crystal for applying a modulating potential across said crystal.

7. A hollow conductor for electromagnetic oscillations having substantially a rectangular cross section, three probes mounted on said conductor at different positions along the length of said conductor, said probes being so mounted that they may be caused to extend into said conductor a variable distance, said probes being so located that successive probes are separated by a distance equal substantially to an odd number of quarter wave lengths of the oscillations to be employed in the conductor as measured in the conductor, said conductor having extending thereinto a re-entrant portion, said re-entrant portion extending along said conductor parallel to the direction of propagation of energy in said conductor, and said three probes being mounted so as to extend through the wall of the conductor which is opposite said re-entrant portion.

CLYDE E. VOGELEY, Jr.
WILLIAM L. STAHL.

References Cited in the file of this patent

UNITED STATES PATENTS

| Number | Name | Date |
| --- | --- | --- |
| 2,477,347 | Posey | July 26, 1947 |
| 2,484,256 | Vaughn | Oct. 11, 1949 |
| 2,556,001 | Robertson | June 5, 1951 |
| 2,557,882 | Marie | June 19, 1951 |

OTHER REFERENCES

"Microwave Transmission Circuits," by Ragan, vol. 9 of the Radiation Laboratory Series, published by McGraw-Hill in 1948, pages 473, 474, 498 and 499 relied on.